(12) United States Patent
Joosten

(10) Patent No.: US 11,092,490 B2
(45) Date of Patent: Aug. 17, 2021

(54) METHOD AND APPARATUS FOR CALIBRATING SPECTROMETERS

(71) Applicant: Spectro Analytical Instruments GmbH, Kleve (DE)

(72) Inventor: Heinz-Gerd Joosten, Kranenburg (DE)

(73) Assignee: SPECTRO ANALYTICAL INSTRUMENTS GMBH, Kleve (DE)

( * ) Notice: Subject to any disclaimer, the term of this patent is extended or adjusted under 35 U.S.C. 154(b) by 0 days.

(21) Appl. No.: 16/707,395

(22) Filed: Dec. 9, 2019

(65) Prior Publication Data
US 2020/0200605 A1 Jun. 25, 2020

(30) Foreign Application Priority Data

Dec. 20, 2018 (DE) ..................... 10 2018 133 042.1

(51) Int. Cl.
*G01J 3/28* (2006.01)
*G01J 3/02* (2006.01)

(52) U.S. Cl.
CPC ............ *G01J 3/2823* (2013.01); *G01J 3/0208* (2013.01); *G01J 3/0237* (2013.01); *G01J 2003/2879* (2013.01)

(58) Field of Classification Search
CPC ........ G01J 3/2823; G01J 3/0237; G01J 3/0208; G01J 3/18; G01J 3/28; G01J 2003/2879; G01J 3/0297
See application file for complete search history.

(56) References Cited

U.S. PATENT DOCUMENTS

| 2009/0028423 | A1* | 1/2009 | Sandstrom ............... G03F 1/84 382/149 |
| 2009/0284740 | A1* | 11/2009 | Joosten ................ G01N 21/274 356/326 |
| 2017/0322077 | A1* | 11/2017 | Bohle ........................ G01J 3/20 |
| 2020/0064191 | A1* | 2/2020 | Bartholomew ........ G01N 21/65 |

FOREIGN PATENT DOCUMENTS

| DE | 10152679 A1 | 4/2003 | |
| WO | WO-2013055273 A1 * | 4/2013 | ............... H04N 5/33 |

* cited by examiner

*Primary Examiner* — Dominic J Bologna
(74) *Attorney, Agent, or Firm* — Panitch Schwarze Belisario & Nadel LLP

(57) ABSTRACT

The invention relates to a method and a spectrometer for wavelength-dependent measurement of radiation in the range of UV light and visible light, with an entry gap, a dispersive element and a number of sensors comprising pixels, wherein a light path runs inside the spectrometer from the entry slot to the sensors and an imaging element is provided, which focusses the radiation on the sensors, in the case of which a means for defocussing the radiation is provided, which is activatable for the purpose of calibration.

15 Claims, 5 Drawing Sheets

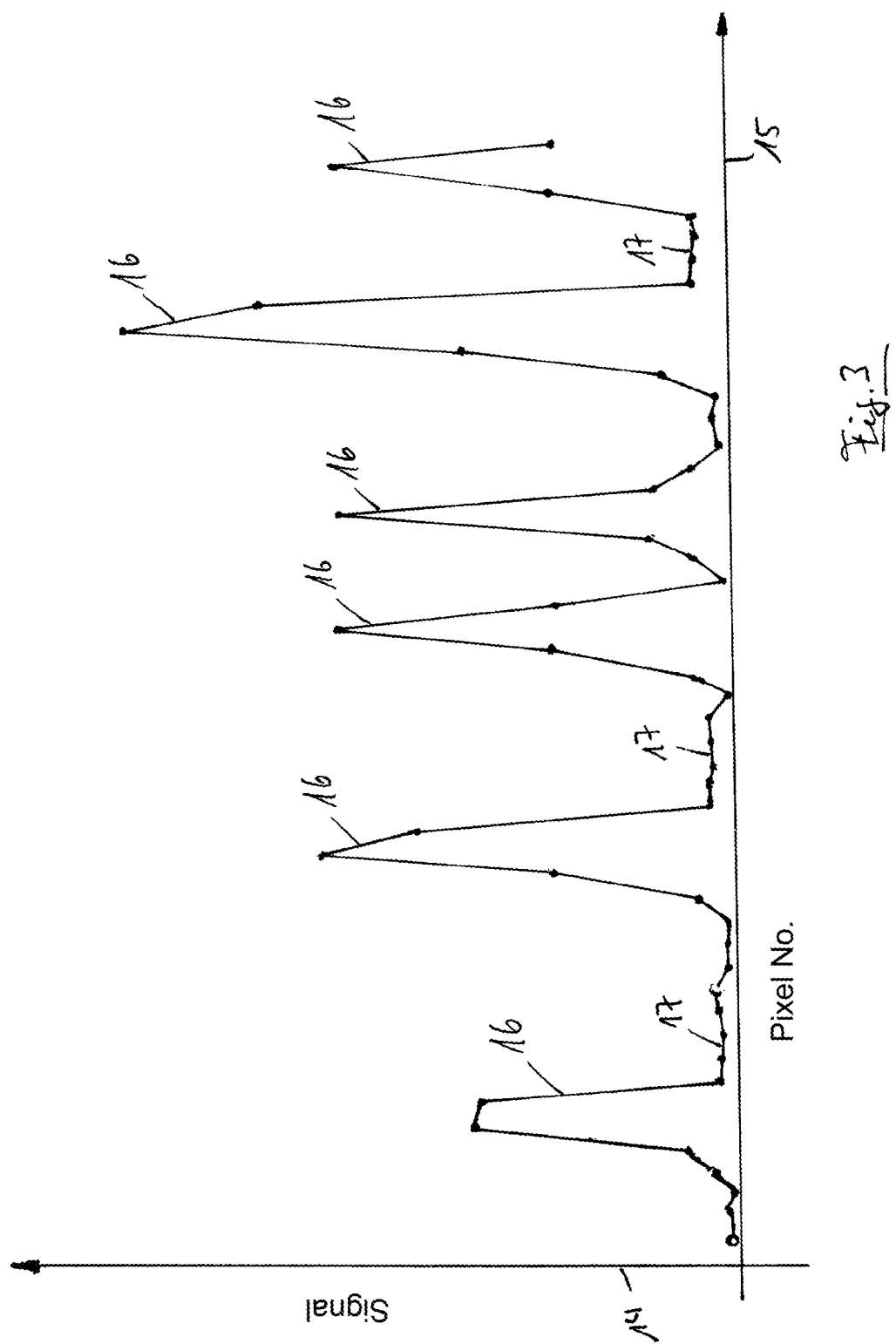

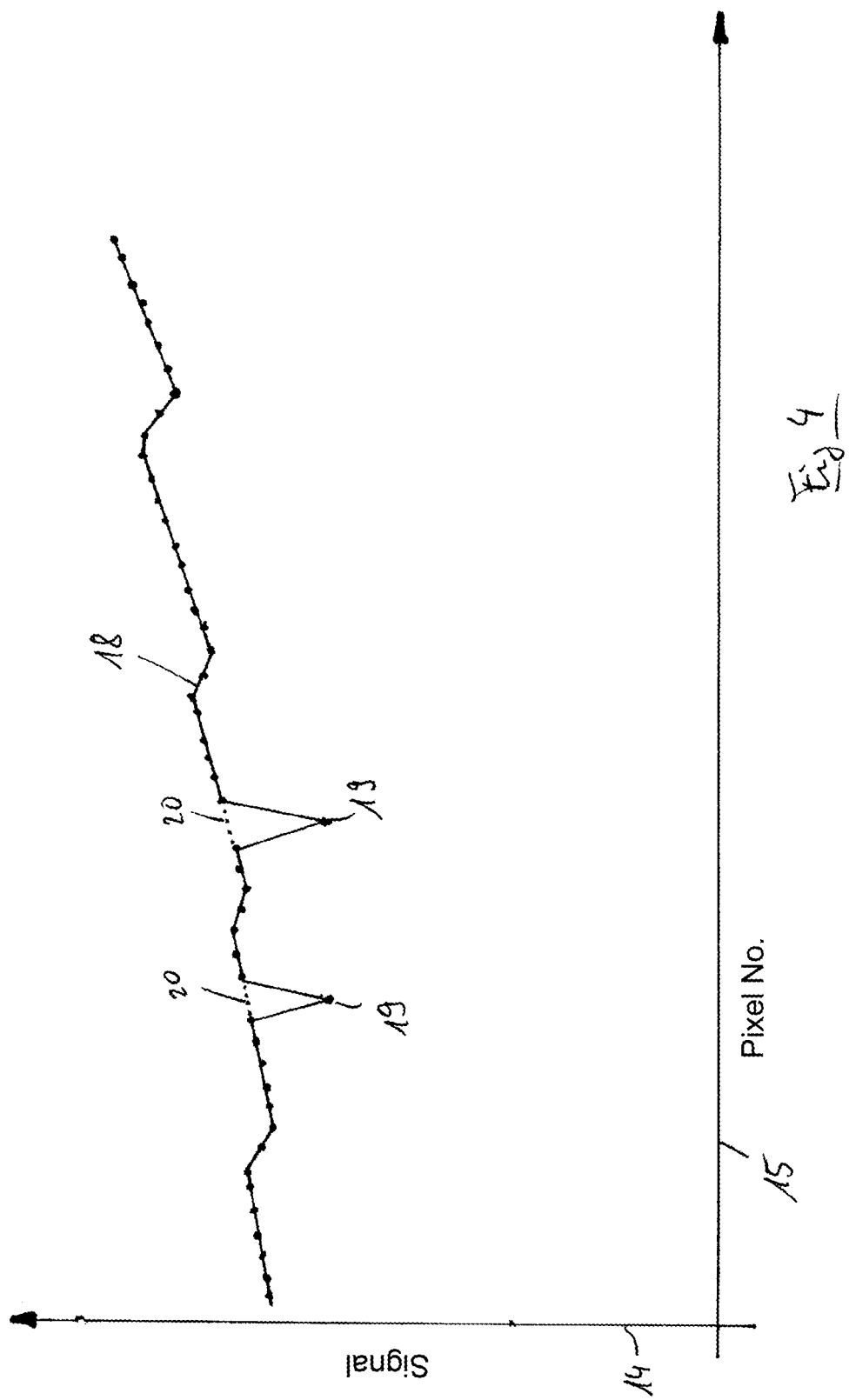

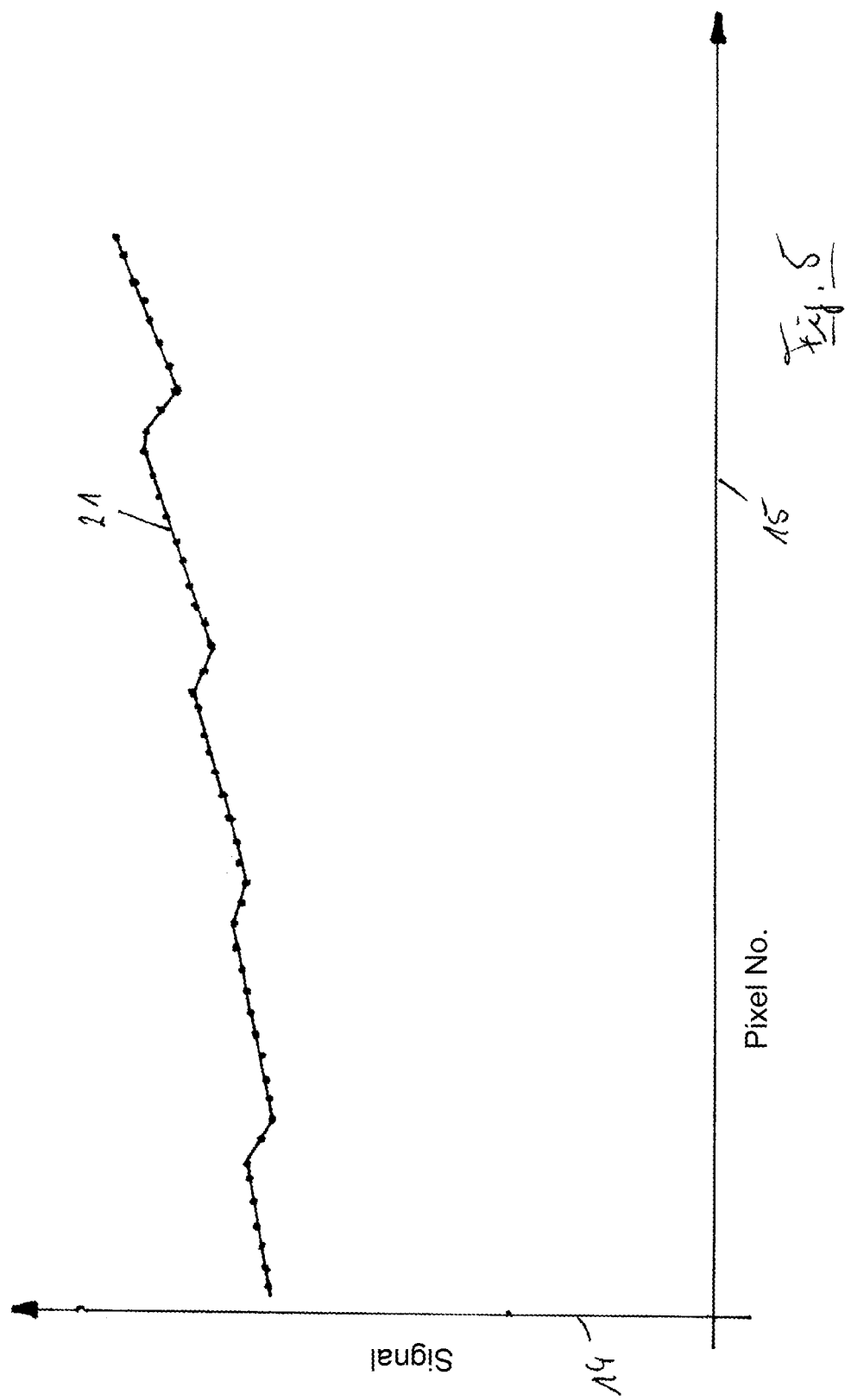

METHOD AND APPARATUS FOR CALIBRATING SPECTROMETERS

Figure 1:
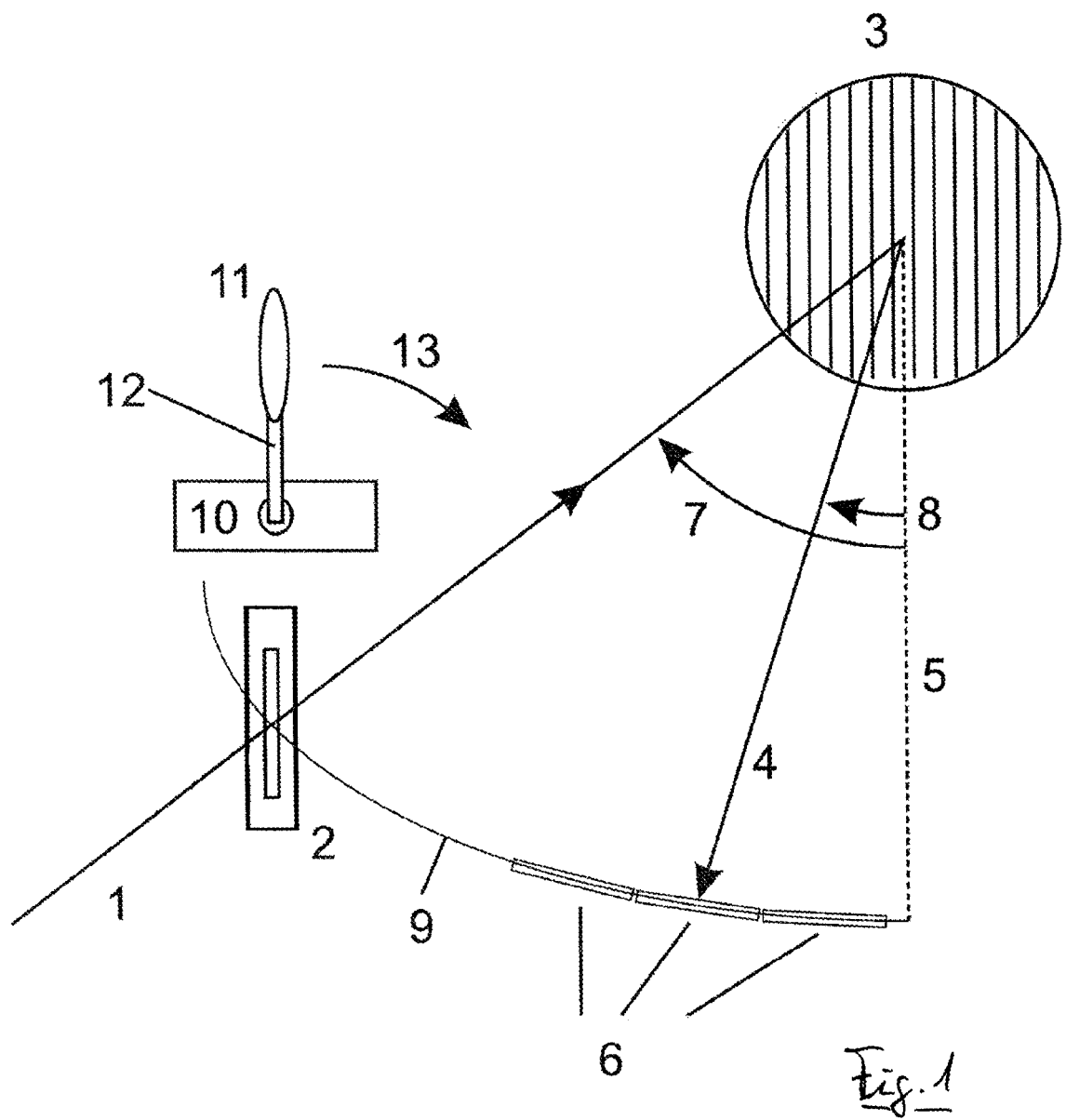

This application is a claims priority from Application No. 10 2018 133 042.1, filed on Dec. 20, 2018 in Germany. The entire contents of these applications are incorporated herein by reference in their entirety.

The present invention relates to a method and an apparatus pertaining to spectrometry.

In spectrometers that detect spectral lines in the wavelength range of ultraviolet light to near infra-red light for element analysis, semiconductor detectors are used to some extent, in the case of which the light-sensitive elements are arranged next to one another in a linear manner as pixels. These detectors are called line sensors. Line sensors are subject to certain wear. If they are exposed to radiation for a long time, they lose their sensitivity. In this context, it is referred to as burn-in effects. Burning-in is understood as the phenomenon of a signal of the size $Int_{Original}$ being obtained in the original state, i.e. in the case of a new line sensor for a radiation quantity St. After longer-term irradiation, this relation changes and only a reduced signal of the size $Int_{Degrad}$ with $Int_{Degrad} < Int_{Original}$ is obtained for the same radiation quantity St on one pixel. If such a burned-in pixel is used to determine a concentration, this can lead to an excessively low determination of the element content. In spectrometry, it is taught that a certain light quantity, which impinges upon a pixel, always produces the same electric signal.

The closest prior art is described in the publication DE 10152679 A1. In this case, the illumination with a light source of any spectral composition is proposed to calibrate sensors, but with emission in the range of spectral sensitivity of the sensors as the basis for the correction. Specifically, according to this prior art, a pixel-specific sensitivity function is determined for a pixel n by the sensor being exposed to a light source, which irradiates all pixels with the same brightness as far as possible. However, it is hardly possible to achieve homogeneous illumination from the first to the last pixel. Adjacent pixels measure a very similar light quantity. The illumination of further remote pixels can, however, differ.

However, the method is not suitable for correcting burn-in effects.

The reason is as follows:

For wavelengths under 300 nm, the sensor must be provided with a fluorescent layer which protects the sensor from destruction by UV radiation and by converting the UV radiation into visible light the detection efficiency increases since the commonly-used sensors cannot detect radiation under 300 nm.

The burning-in can, in the case of such coated sensors, affect either the fluorescence layer or the pixel itself. Damage to both the fluorescence layer and the sensor in varying amounts is also to be observed. It is therefore not expedient to carry out a calibration of the pixel sensitivity for the UV range with visible light. This radiation does not lead to fluorescence. Damage to the fluorescence layer is not to be detected. On the other hand, a UV radiation source is, however, also not suitable for a fixed wavelength. In order to be able to carry out an accurate correction, each pixel must be exposed to radiation approximating the wavelength which should subsequently be measured with the pixel in question. Only in this case is it irrelevant whether pixels or fluorescence layer are damaged.

It is therefore the object of the present invention to provide a method and an apparatus by means of which a reduced sensitivity of individual pixels can be identified and compensated.

This object may be achieved by a method and an apparatus having features as set forth in various ones of the appended claims.

In the case of the method of calibrating the sensitivity of pixels of pixel-based sensors in a spectrometer, the following steps are provided:

a) Generating a radiation with a plurality of spectral lines in the range of ultraviolet and visible light, with the radiation along a light path inside the spectrometer falling from an entry slot to a dispersive element and from there on the sensors.

b) Defocussing the radiation such that the focus lies in the direction of propagation of the light at a distance from the pixels, c) Detecting the radiation in a region of pixels left and right of the pixel p to be examined, d) Calculating an expected value e of the signal of the pixel p to be examined from the measured values of the adjacent pixels in the region, e) Comparing the expected value e with the measured value I for the pixel p and f) If the measured value I is below the expected value e by more than a limit value dI, calculating a correction factor $K_p$, by means of which, in the case of future measurements, the actual measured value of the pixel p is adjusted to correct the measured value.

g) Suspending the defocussing, with the radiation being focussed on the pixels.

The following steps are carried out for a measurement of a sample after the calibrating operation.

h) Detecting the radiation, which falls on each pixel, and determining a measured value I for each pixel of the spectrometer, i) Correcting the measured values I of each pixel by applying the correction factor $K_p$ determined in step f), for example by multiplying with the correction factor.

With these steps, irradiation of all pixels with similar wavelengths can be achieved, as to be subsequently measured with the pixel in question. However, a correction for each individual pixel can be performed, if this is required according to the measurement result as a result of a deviation from the expected value.

An advantageous embodiment provides that for a good average value formation in step c) the same number of adjacent pixels is evaluated left and right of the pixel p to be examined, with the exception of the edge regions of the sensor. In the case of a complete calibration, it is advantageous when the steps c) to f) are carried out for each pixel of the sensors of the spectrometer. The terms "left" and "right" here relate to the direction of propagation of the radiation from the dispersive element to the sensors.

If, in step d), the expected value is determined by means of regression calculation via the measured values I of the adjacent pixels, with the measured value of the pixel p itself not being used for the calculation, a particularly precise prediction can be made for the measured value to be expected of the pixel. In this case, the regression can be carried out in a simple manner as a balance line.

If, in step f), the correction factor for each pixel is determined as a quotient of the expected value e divided by the measured value I, the correction factor can be determined as a simple numeric value for each pixel, stored and used for the correction of a real measurement.

The defocussing, which is performed for the calibration, is again reversed, by the radiation being re-focused on the pixels, after the steps a) to f) have been carried out for each pixel of the spectrometer. The spectrometer is then ready measure.

If the defocussing in step b) is carried out such that the focal point measured in the direction of propagation of the radiation is at a distance Df in front of or behind the light-sensitive surface of the sensor, the radiation is scattered over sufficient numbers of adjacent pixels, without individual pixels being illuminated excessively weakly for the calibration.

One example is supposed to show the dimensioning of the defocussing Df: In practice, it is shown that samples are available for adjustment, in the case of which the distance of sufficiently intense spectral lines in the spectral ranges relevant for a burn-in correction is 0.3 nm or less. Furthermore, on the basis of the real data distance grid-focal curve 650 mm
illumination width on the grid 28 mm
pixel resolution 14 µm, the defocussing Df must be at least so great that the signal of a spectral line is distributed on 0.3 nm or 60 pixels. 0.3 nm corresponds to 14 µm*60=0.84 mm. According to the theorem on intersecting lines of geometry, the paths must be distanced 0.84*650/28 mm, i.e. by 19.5 mm from the focal curve in order to obtain the desired line broadening. Df is selected for the mentioned example, i.e. Df>=19.5 mm.

Advantageously, a sample is used for the radiation generation in step a), with which a particular line-rich radiation can be generated in the short-wave UV range.

Because in the case of a spectrometer for wavelength-dependent measurement of radiation in the range of UV light and visible light, with an entry slot, a dispersive element and a number of sensors comprising pixels, with a light path running inside the spectrometer from the entry slot to the sensors and an imaging element being provided which focuses the radiation on the sensors, a means for defocussing the radiation is also provided, which is activatable for the purpose of calibration, individual pixels with low sensitivity can be identified and for each of these pixels a correction factor can be determined for the sensitivity correction for subsequent measurements.

The means for defocussing the radiation is preferably a lens since, in the case of this optical element very reliably reproducible optical conditions can be achieved and the loss of intensity is low.

An actuator is preferably provided in the spectrometer which is mechanically connected to the means. This can be for example a swivel drive which directly bears a lens with a swivel arm.

However, it is also advantageous when the actuator has a movement range, which makes the means displaceable from a first position outside of the light path into a second position inside of the light path. The means for defocussing can then remain in the spectrometer during the measurement operation and can be moved into the light path if required, for example as a function of a controller, which initiates the calibration operation.

The second position is particularly preferably provided between the entry slot and the dispersive element since a lens of small diameter can be used there. Advantageously, the lens is a cylindrical lens which causes the defocussing largely along the focal curve, while the defocussing remains low perpendicular the focal curve. This means that the overall intensity of the radiation on the focal curve, in spite of the defocussing, is not reduced to an undesired extent as a result of radiation being scattered from the focal plane and therefore no longer being useful as a signal for the sensors.

The beam path is particularly simple and effective when the dispersive element is at the same time also the imaging element, for example in the form of a concave diffraction grid.

When the means for defocussing is used in a divergent or convergent region of the light path, it can also be a plane-parallel plate.

The actuator is preferably a swivel drive, whereby the arrangement is particularly compact.

The means for defocussing is preferably designed such that it displaces the focus of the radiation in the region of the sensors by a defocussing path Df, whose value depends on illumination width of the grid, grid focal length and number of grid lines, when it is moved into the second position.

Figure 2:
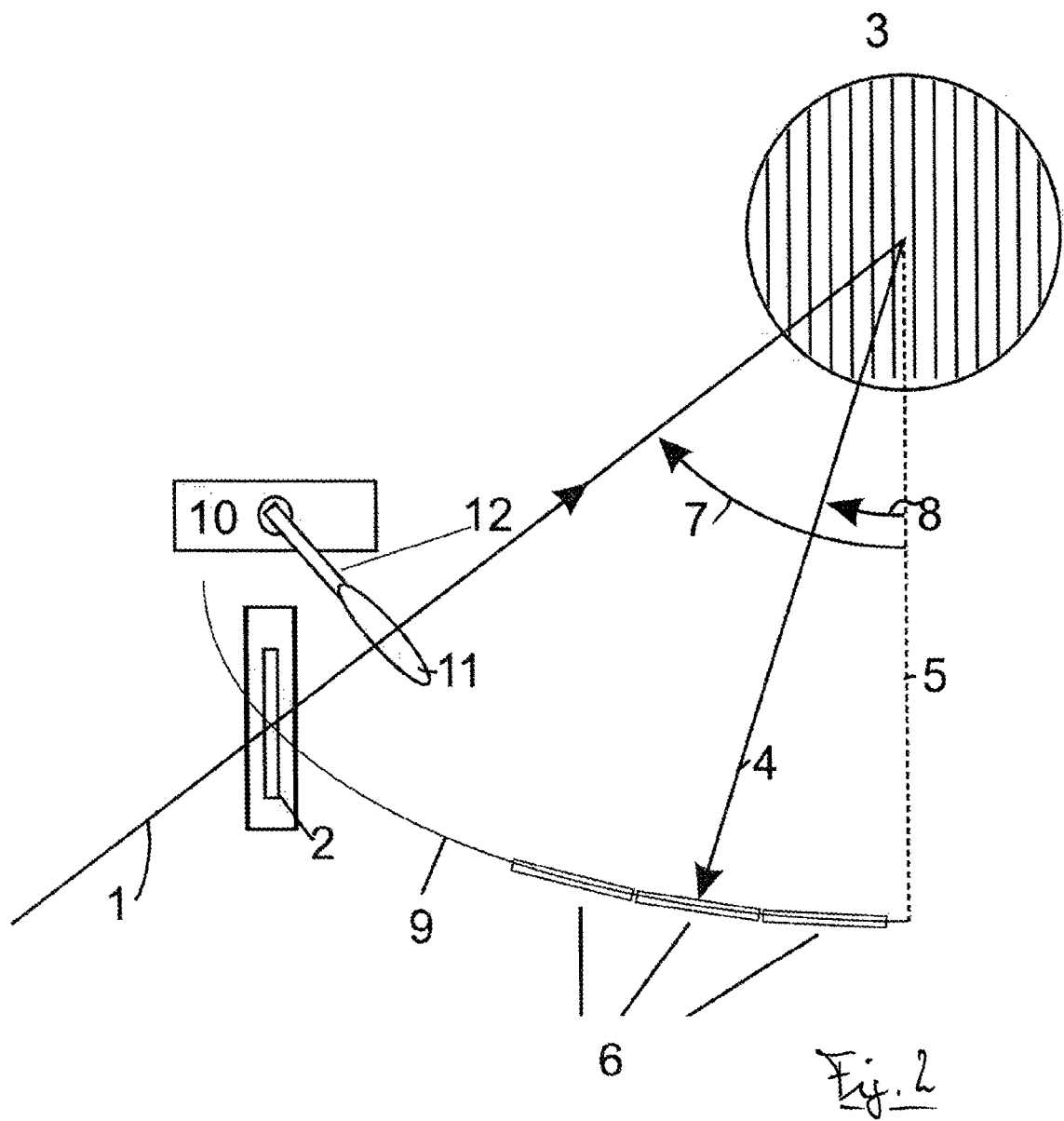

An embodiment of the invention is described in more detail on the basis of the drawing. In the drawing:

FIG. 1: shows a schematic representation of the light path in a spectrometer according to the invention in the measurement operation in the case of which the radiation is focussed on the sensors;

FIG. 2: shows the structure from FIG. 1 in the calibration operation;

FIG. 3: shows a spectrum of an exemplary matching sample in the UV range;

FIG. 4: shows the signal generated by the pixels in the case of contact with the spectrum from FIG. 3 after defocussing; and FIG. 5: shows the signal from FIG. 4 after correction of the reduced sensitivity of the two pixels identified as defective.

FIG. 1 shows the schematic structure of the optical system of a spectrometer. A source generates incident radiation 1 with a plurality of wavelengths in the range of visible light and of UV light. The relative intensities of the spectral lines are in a manner known per se a measurement for the proportions of chemical elements in the sample. The radiation 1 enters at the start of the light path through the entry slot 2 and falls from there on a dispersive element, often an optical grid 3 and is bent there. The angle 8 of the outgoing radiation 6 in relation to the grid normal 5 is dependent on the wavelength of the radiation and the angle 7 of the incident radiation (also in relation to the grid normal 5). The spectrum is sharply imaged on the focal curve 9 where the sensors 6 are arranged. The described light path inside the spectrometer ends here. Only an outgoing beam is imaged in FIG. 1. However, since the incident radiation is a mixture of many wavelengths, many different outgoing beams must be dealt with, of which only one beam is represented as an example. The outgoing wavelengths appear as peaks in the spectra recorded by the sensors 6. The sensors are mounted on the focal curve 9 in order to be able to detect the sharpest possible peaks, i.e. wavelength-dependent bent images of the entry slot 2.

An apparatus is also represented in FIG. 1 which can be switched on to displace the focal curve. An approximately continuous signal can be generated by defocussing the spectrum, as will be explained further below.

Specifically, the apparatus comprises an actuator 10, for example in the form of a servo motor, on whose drive shaft a lever arm 12 is fastened which is connected to an optical element 11, e.g. to a plane-parallel plate made of transparent material (refractor plate) or a lens. FIG. 1 shows the position of the optical element 11 in the rest position, i.e. the position in which normal measurements are carried out.

FIG. 2 shows the spectrometer from FIG. 1, with the optical element having been moved into the light path between the entry slot 2 and the grid 3. The optical component 11 is moved by corresponding actuation of the actuator 10 into the light path to prepare for the calibration. The movement direction is shown by the arrow 13. FIG. 2 shows the end position of the optical element to record a blurred spectrum. The optical element leads to the spectrum no longer being sharply imaged on the focal curve 9, but rather in front of it or behind it. In the case of using a refractor plate for 11, the light path is e.g. optically extended by a path s, $$s=(n_R-n_U)*d \quad \text{(Formula 1)},$$

In this case, in formula 1, $n_R$ designates the calculation index of the refractor material, $n_U$ the refractive index of the surrounding medium and d the geometric length of the path of the radiation through the refractor. Owing to the concave mirror property of the grid 3, the following applies $$1/LE+1/LA=1/f \quad \text{(Formula 2)}.$$

In this case, LE designates the optical path length of the incident beam 1 between entry slot and grid, LA indicates the length of the bent radiation (e.g. of 4) between grid and sensor, f designates the focal width of the grid.

For the frequently selected arrangement that the angle of the incident beam (7) is greater than all outgoing beams, LE>=LA. Therefore, owing to formula 2, it applies that the focal curve 9 is displaced by a path s'>=s in the direction of the grid 3. The sensors therefore see the spectrum blurred.

It may be advantageous to use a lens as an optical element 11. In order to achieve a displacement of the focal curve of a number of millimetres using refractors, it must be made of a relatively strong material which, owing to the transmission losses associated therewith, is often undesired. A lens provides the same displacement with lower material strength.

A line-rich matching sample must be measured for full spectrum recalibration, as is described in the German patent DE 10152679. FIG. 3 shows how such a spectrum appears in principle. There are numerous lines 16, but also regions 17, in which no signal is detected.

The spectrum of this matching sample is thus not suitable for a calibration, in the case of which burn-in effects of individual pixels are supposed to be corrected because there are regions 17 without spectral signals and where spectral lines 16 appear, the signal change from pixel to pixel is very large and therefore outliers cannot be easily detected.

"Burning-in" of pixels may also result where the matching sample does not show any line. If, for example, the matching sample does not contain aluminium, but aluminium samples are continuously measured with the spectrometer system, burn-in effects may result in the case of pixels which measure specific aluminium lines. This is particularly the case for the pixels in which the very sensitive aluminium line 167.1 nm is measured. The spectrum of the matching sample, however, does not help since a sufficient spectral signal does not appear.

FIG. 4 shows by way of example the course of the spectrum 18 in the case of the optical element 11 moved into the light path. In this example, each pixel p obtains radiation from a spectral range, which, in the case of the optical element not moved into the light path, originates from a spectral environment of roughly 30 pixels in front of and behind or to the right and left of the selected pixel p. Modern high-resolution spectrometers use between 120 and 220 nm, approx. 20000 pixels for the spectral range such that an interval of 60 pixels corresponds to only 0.3 nm.

This means e.g. for a pixel, which is supposed to measure the wavelength 193.00 nm that it sees radiation of an interval 192.85 and 193.15 nm in the case of a retracted element 11. This radiation to be used for the correction is therefore very similar to the wavelength to be measured of 193.00 nm.

The correction of the sensitivity of damaged pixels, also called burn-in correction, can now be carried out for example as follows:

1. Fold the optical component 11, which causes a sharp spectrum in the incident light path 1. This position is represented by FIG. 2;
2. Measure a sample with line-rich spectrum;
3. For all pixels p of all sensors, proceed as follows:
4. Observe an interval of i pixels in front of to i pixels behind the pixel p to be examined;
5. Form a balance line over these 2i pixels for each regression calculation, with the pixel p itself not being used for the calculation (examples for such a balance line 20 are found in FIG. 5);
6. Compare the expected value e, determined by the balance line, of the intensity to be expected at the point p with the measured value I in the case of pixel p;
7. If the measured value I is significantly below the expected value e, then for all future measurements multiple the intensities measured by p with the factor e/I;
8. After calculating all pixels, move the optical component 11 back into the rest position again (the rest position is represented in FIG. 1).

The burn-in correction according to this method is also suitable for performing the correction described in the patent application DE 10152679 A1 of dirt and imperfect pixel uniformity.

LIST OF REFERENCE NUMERALS

1 Incident radiation
2 Entry slot
3 Grid
4 Example of outgoing radiation bent by the grid
5 Grid normal
6 Sensors on focal curve
7 Angle of incident radiation in relation to the normal
8 Angle of the outgoing radiation bent by the grid for an exemplary wavelength
9 Focal curve
10 Actuator, embodied e.g. as a servo motor or step motor
11 Optical component (plane-parallel glass plate or lens), which prevents sharp imaging on the focal curve 9
12 Holding arm for optical element 11
13 Movement direction of the holding arm 12 to transport the optical component 11 into the incident light path 1
14 Y-axis, represents intensities
15 X-axis, on which pixel numbers are plotted
16 Peaks of spectral lines in the spectrum of a matching sample
17 Points in the spectrum at which no spectral lines are located
18 Spectrum made blurred by folding in the optical element 11
19 Burned-in pixels, i.e. pixels with reduced sensitivity
20 Balance lines, per regression calculated from pixel intensities of adjacent pixels
21 Corrected spectrum

What is claimed is:
1. A method of calibrating the sensitivity of pixels of pixel-based sensors in a spectrometer, the method including:

a) generating a radiation with a plurality of spectral lines in the range of ultraviolet and visible light, wherein the radiation along a light path inside the spectrometer falls from an entry slot to a dispersive element and from there on the sensors,
b) defocusing the radiation such that a focus lies in a direction of propagation of the radiation at a distance from the pixels,
c) detecting the radiation in a range of pixels in front of and behind a pixel p to be examined,
d) calculating an expected value e of a signal of the pixel p to be examined from measured values of adjacent pixels in the range,
e) comparing the expected value e with a measured value I for the pixel p,
f) if the measured value I is below the expected value e by more than a limit value dI, calculating a correction factor, by means of which, in the case of future measurements, actual measured value of the pixel p is adjusted to correct the measured value, and
g) suspending the defocusing, wherein the radiation is focused on the pixels.

2. The method according to claim 1, wherein, after calibrating for a measurement of element content of a sample, the method further includes:
h) detecting radiation that falls on each pixel of the spectrometer, and determining a measured value I for each pixel of the spectrometer, and
i) correcting the respective measured value I for each pixel by multiplying with the correction factor determined in f).

3. The method according to claim 1, wherein in d), a common number of adjacent pixels is evaluated in front of and behind the pixel p to be examined, with the exception of the edge regions of the sensor.

4. The method according to claim 1, wherein c) to f) are carried out for each pixel of the spectrometer.

5. The method according to claim 1, wherein in d), the expected value is determined by means of regression calculation via the measured values I of the adjacent pixels, wherein the measured value of the pixel p itself is not used for the calculation.

6. The method according to claim 1, wherein in f), the correction factor for each pixel is determined as a quotient of the expected value e divided by the measured value I for the respective pixel.

7. The method according to claim 1, wherein the defocusing in b) is carried out such that a focal point measured in the direction of propagation of the radiation is at a distance of at least a path D, dependent on a grid focal length, a number of grid lines and an illumination width, in front of or behind a light-sensitive surface of the sensor.

8. The method according to claim 1, wherein, in order to generate the radiation in a), an aluminium-containing or iron-containing sample is used.

9. A spectrometer designed to carry out the method according to claim 1, the spectrometer including:
an entry slit to admit into the spectrometer the radiation with a plurality of spectral lines in the range of ultraviolet and visible light;
a dispersive element onto which the light path of the radiation is directed and that further directs the radiation onto a plurality of pixel-based sensors; and
a defocusing element, forming a part of the spectrometer, which is enabled to be disposed in the light path to perform the defocusing of the radiation in the light path between the entry slit and the dispersive element, and which is enabled to be removed from the light path to perform the suspending of the defocusing.

10. A spectrometer designed for wavelength-dependent measurement of radiation in the range of UV light and visible light, including:
an entry slot,
a dispersive element,
a number of sensors comprising pixels, wherein a light path runs inside the spectrometer from the entry slot to the sensors,
an imaging element configured to focus the radiation in the range of UV and visible light on the sensors,
a means for defocusing the radiation in the range of UV and visible light, wherein
the means for defocusing is activatable for the purpose of calibration, and
a mechanical actuator mechanically connected to the means for defocusing, wherein the actuator has a movement range that makes the means for defocusing displaceable from a first position outside of the light path into a second position inside of the light path, wherein the second position is between the entry slot and the dispersive element.

11. The spectrometer according to claim 10, wherein the means for defocusing the radiation in the range of UV and visible light comprises a lens.

12. The spectrometer according to claim 10, wherein the dispersive element is at the same time also the imaging element.

13. The spectrometer according to claim 10, wherein the means is a plane-parallel plate.

14. The spectrometer according to claim 10, wherein the actuator comprises a swivel drive.

15. The spectrometer according to claim 10, wherein the means for defocusing is designed such that it displaces focus of the radiation in the range of UV and visible light in a region of the sensors by at least one path D dependent on grid focal length, a number of grid lines and an illumination width, when it is moved from a first position outside of the light path into a second position inside of the light path.

* * * * *